United States Patent
Matsubara et al.

(10) Patent No.: US 11,150,615 B2
(45) Date of Patent: Oct. 19, 2021

(54) OPTIMIZATION DEVICE AND CONTROL METHOD OF OPTIMIZATION DEVICE

(71) Applicant: FUJITSU LIMITED, Kawasaki (JP)

(72) Inventors: Satoshi Matsubara, Machida (JP); Motomu Takatsu, Shinjuku (JP)

(73) Assignee: FUJITSU LIMITED, Kawasaki (JP)

( * ) Notice: Subject to any disclaimer, the term of this patent is extended or adjusted under 35 U.S.C. 154(b) by 126 days.

(21) Appl. No.: 16/675,278

(22) Filed: Nov. 6, 2019

(65) Prior Publication Data

US 2020/0209813 A1 Jul. 2, 2020

(30) Foreign Application Priority Data

Dec. 26, 2018 (JP) ............................. JP2018-242600

(51) Int. Cl.
*G05B 13/00* (2006.01)
*G05B 13/04* (2006.01)
*G05D 23/19* (2006.01)

(52) U.S. Cl.
CPC ....... *G05B 13/041* (2013.01); *G05D 23/1917* (2013.01)

(58) Field of Classification Search
CPC .... G05B 13/041; G05B 17/02; G05B 13/024; G05D 23/1917; G06N 7/005; G06N 5/003
See application file for complete search history.

(56) References Cited

U.S. PATENT DOCUMENTS

| 5,148,514 A * | 9/1992 | Arima ................... G06N 3/063 706/34 |
| 2003/0144748 A1 | 7/2003 | Nakamura et al. |

(Continued)

FOREIGN PATENT DOCUMENTS

| JP | 8-153085 A | 6/1996 |
| JP | 2001-250102 A | 9/2001 |

(Continued)

OTHER PUBLICATIONS

Deutsch, Clayton V., and Perry W. Cockerham. "Practical considerations in the application of simulated annealing to stochastic simulation." Mathematical Geology 26.1 (1994): 67-82. (Year: 1994).*

(Continued)

*Primary Examiner* — Michael D Masinick
(74) *Attorney, Agent, or Firm* — Fujitsu Patent Center (57) ABSTRACT

An optimization device includes: a state hold circuit that holds values of state variables included in an evaluation function that represents energy; an objective function calculation circuit that calculates an energy change value in an objective function included in the evaluation function for each of state transitions when a state transition occurs in response to a change in any of the values of the state variables; a constraint term calculation circuit that calculates a constraint term evaluation value, which is an evaluation value of a constraint term included in the evaluation function, for each of the state transitions; a temperature control circuit that controls a temperature value that indicates a temperature; and a transition control circuit that determines stochastically whether to accept any of the state transitions based on the temperature value, a random number value, and a sum of the change value and the constraint term evaluation value.

6 Claims, 7 Drawing Sheets

(56) References Cited

U.S. PATENT DOCUMENTS

| | | | |
|---|---|---|---|
| 2013/0290763 | A1 | 10/2013 | Katsumata |
| 2019/0012410 | A1* | 1/2019 | Matsubara ............ G06F 30/367 |
| 2019/0220732 | A1* | 7/2019 | Shibasaki ............. G06N 3/086 |
| 2019/0278829 | A1* | 9/2019 | Takatsu .................. G06F 17/17 |
| 2020/0050921 | A1* | 2/2020 | Tamura .................. G06N 3/063 |
| 2020/0090051 | A1* | 3/2020 | Shimada ............... G06N 5/003 |
| 2020/0110790 | A1* | 4/2020 | Yoneoka .................. G06F 7/57 |
| 2020/0117697 | A1* | 4/2020 | Miyazawa ............. G06F 7/544 |
| 2020/0151548 | A1* | 5/2020 | Yoneoka ............. G06N 3/0445 |
| 2020/0166900 | A1* | 5/2020 | Koyama ............. G05B 19/042 |
| 2020/0209813 | A1* | 7/2020 | Matsubara ............. G06N 7/005 |
| 2020/0278385 | A1* | 9/2020 | Matsubara ............. G06N 5/003 |
| 2020/0326673 | A1* | 10/2020 | Kanda ...................... G06F 7/48 |

FOREIGN PATENT DOCUMENTS

| | | |
|---|---|---|
| JP | 2003-223322 A | 8/2003 |
| JP | 2005-258609 A | 9/2005 |

OTHER PUBLICATIONS

Robini, Marc C., and Pierre-Jean Reissman. "From simulated annealing to stochastic continuation: a new trend in combinatorial optimization." Journal of Global Optimization 56.1 (2013): 185-215. (Year: 2013).*

Han, Xiaoxia, et al. "State-transition simulated annealing algorithm for constrained and unconstrained multi-objective optimization problems." Applied Intelligence 51.2 (2021): 775-787. (Year: 2021).*

Kirkpatrick, S. et al., "Optimization by Simulated Annealing", Science, American Association for the Advancement of Science, US, vol. 220, No. 4598, May 13, 1983, pp. 671-680, XP000575729.

Extended European Search Report dated dated May 20, 2020 for corresponding European Patent Application No. 19206306.3, 8 pages.

U.S. Office Action dated Aug. 19, 2019 for copending U.S. Appl. No. 16/021,259, 9 pages.

Schneider, Christian R. et al., "Analog CMOS Deterministic Boltzmann Circuits", IEEE Journal of Solid-State Circuits, vol. 28, No. 8, Aug. 1993, pp. 907-914.

Notice of Allowance dated Nov. 19, 2019 for copending U.S. Appl. No. 16/021,259, 5 pages.

EPOA—Official Communication of European Patent Application No. 19206306.3 dated Jun. 30, 2021. ** Non-patent literature document cited in the EPOA was previously submitted in the IDS filed Jul. 28, 2020.

* cited by examiner

OPTIMIZATION DEVICE AND CONTROL METHOD OF OPTIMIZATION DEVICE

CROSS-REFERENCE TO RELATED APPLICATION

This application is based upon and claims the benefit of the prior Japanese Patent Application No. 2018-242600 filed on Dec. 26, 2018, the entire contents of which are incorporated herein by reference.

FIELD

The embodiments discussed herein are related to an optimization device and a control method of the optimization device.

BACKGROUND

Information processing is being performed in almost every field in the present society. The information processing is performed using an arithmetic apparatus such as a computer, and various processing such as a prediction, a determination, a control, and the like are performed by calculating and processing various data to obtain meaningful results. One of the fields of information processing is an optimization problem which is regarded as an important field. For example, there is a problem of minimizing resources and costs required to perform a certain process, or a problem of finding a solution which maximizes the effect of the process. It is clear that such problems are of great importance.

A linear programming problem is a representative of optimization problem. The linear programming problem is to obtain a value of a variable that maximizes or minimizes an evaluation function represented by the linear sum of plural continuous variables under the constraint condition represented by the linear sum, and is used for various fields such as a production planning. As for the linear programming problem, excellent solution methods such as a simplex method and an interior point method are known and even problems having hundreds of thousands of variables may be efficiently solved by the linear programming problem.

In the meantime, it is known that many optimization problems take discrete values rather than continuous values. For example, there may be a traveling salesman problem of seeking the shortest route when going back through multiple cities in turn, or a knapsack problem of seeking a combination that maximizes the sum of the values when packing different items into a knapsack. Such problems are called discrete optimization problems, combinatorial optimization problems, etc., and it is known that it is very difficult to obtain an optimal solution.

The biggest cause of difficulty in solving discrete optimization problems is that, since each variable only takes discrete values, a method of changing the variables continuously in a direction in which the evaluation function is improved to reach the optimal solution may not be used. In addition, there are very many values which locally give an extreme value of the evaluation function (minimum (large) solutions, local solutions) in addition to the values of the variables which give the original optimum value (optimum solution, global solution). For this reason, it is necessary to take an exhaustive method to make sure that an optimal solution is obtained and, as a result, a calculation time may be substantially extended. The discrete optimization problems have many problems, which are called NP (Non-deterministic Polynomial) difficulty problems in computational complexity theory, that is expected that the calculation time for finding the optimal solution may increase exponentially with the size of the problem (i.e., the number of variables). The traveling salesman problem and the knapsack problem are also NP difficulty problems.

As described above, it is difficult to reliably obtain the optimal solution of the discrete optimization problem. Therefore, with respect to the discrete optimization problem that is important for practical use, solutions using properties inherent to the problem have been devised. As described above, since many discrete optimization problems are expected to take exponentially increasing computation time to obtain an exact solution, most practical solutions are not optimal solutions but approximate solutions which may obtain a solution in which the value of the evaluation function is close to the optimum value.

With respect to an approximate algorithm specific to the problems, approximate solutions that may handle a wide range of problems in order to solve the problems without using the nature of the problems are also known. Such solutions are called metaheuristic solutions, and may include a simulated annealing method (SA method), a genetic algorithm, a neural network, and the like. Although these methods may be less efficient than solutions that take advantage of the nature of the problems, these methods may be expected to obtain solutions faster than solutions that obtain exact solutions.

Related techniques are disclosed in, for example, Japanese Laid-open Patent Publication No. 2003-223322 and Japanese Laid-open Patent Publication No. 08-153085.

A penalty coefficient, which is a proportional coefficient of the constraint term, may not be made too small so that the solution of the minimum energy does not include constraint violation. In the meantime, when the penalty coefficient is made too large, the acceptance probability of transition to the constraint violation state becomes lower so that the time for the solution to reach the optimal solution becomes longer. In many combinatorial optimization problems, an evaluation function including a plurality of constraint terms corresponding to a plurality of constraint conditions is used. In many cases, a solution may go through the constraint violation state that violates the plurality of constraint conditions many times, and reach an optimal solution. In such problems, the potential peak due to the constraint term is further increased and the acceptance probability of transition to the constraint violation state is further decreased, which takes a long time for search for optimal solution (ground state).

SUMMARY

According to an aspect of the embodiments, an optimization device includes: a state hold circuit configured to hold values of a plurality of state variables included in an evaluation function that represents energy; an objective function calculation circuit configured to calculate an energy change value in an objective function included in the evaluation function for each of a plurality of state transitions when a state transition occurs in response to a change in any of the values of the plurality of state variables; a constraint term calculation circuit configured to calculate a constraint term evaluation value, which is an evaluation value of a constraint term included in the evaluation function, for each of the plurality of state transitions; a temperature control circuit configured to control a temperature value that indicates a temperature; and a transition control circuit configured to determine stochastically whether to accept any of the plurality of state transitions based on the temperature value, a random number value, and a sum of the change value and the constraint term evaluation value.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

The simulated annealing method will be described below.

The simulated annealing method is a kind of Monte Carlo method, and is a method of stochastically obtaining a solution using a random number value. In the following, a problem of minimizing the value of an evaluation function to be optimized will be described as an example, and the value of the evaluation function will be called energy. In the case of maximization, the sign of the evaluation function may be changed.

Starting from the initial state in which one of discrete values is substituted for each variable, a state close to the state (e.g., a state in which only one variable is changed) is selected from the current state (a combination of variable values) and a state transition thereof is considered. The energy change for the state transition is calculated, and the state transition is adopted according to the value to stochastically determine whether to change the state or to keep the original state without adopting the state transition. When the adoption probability of a case where energy falls is selected to be larger than a case where energy rises, a state change occurs in the direction of energy decrease on average, and it may be expected that a state transition to a more appropriate state occurs with the passage of time. Finally, it may be possible to obtain an optimal solution or an approximate solution giving energy close to the optimal value. When such a solution is adopted for a case where energy falls deterministically or when such a solution is not adopted for a case where energy rises, the energy change becomes a broad monotonous decrease over time, but no more changes occur once the energy change reaches a local solution. As described above, since the discrete optimization problem has a large number of local solutions, a state is mostly caught by local solutions that are not close to the optimal value. Therefore, it is important to determine stochastically whether to adopt the state.

In the simulated annealing method, it has been proved that the state reaches the optimum solution at the limit of time (number of iterations) infinity when the adoption (acceptance) probability of the state transition is determined as follows.

For the energy change value ($\Delta E$) accompanying the state transition, the acceptance probability p of the state transition is determined by the following function f(x) represented by an equation (1). An equation (2) is the Metropolis method. An equation (3) is the Gibbs method.

[Equation 1]
$$p(\Delta E, T) = f\left(-\frac{\Delta E}{T}\right) \qquad (1)$$

[Equation 2]
$$f_{metro}(x) = \min(1, e^x) \qquad (2)$$

[Equation 3]
$$f_{Gibbs}(x) = \frac{1}{1 + e^{-x}} \qquad (3)$$

Here, the sign "T" is a parameter called a temperature value and is changed as follows. That is, the temperature value T is reduced logarithmically to the number of iterations t as expressed by the following equation.

[Equation 4]
$$T = \frac{T_0 \log(c)}{\log(t + c)} \qquad (4)$$

Here, the sign "$T_0$" is an initial temperature, which needs to be large enough according to a problem.

When using the acceptance probability represented by the equations (1) to (3), assuming that the state reaches the steady state after sufficient repetition, the occupancy probability of each state follows the Boltzmann distribution with respect to the thermal equilibrium state in thermodynamics. In addition, since the occupancy probability of a low energy state increases when the temperature is gradually lowered from the high temperature, the low energy state may be obtained when the temperature is sufficiently lowered. This method is called a simulated annealing method because the method is very similar to a state change when a material is annealed. At this time, the stochastic occurrence of a state transition in which energy rises corresponds to thermal excitation in physics.

In the above-mentioned simulated annealing method, an optimum solution may be obtained when the number of iterations is taken infinitely, but in reality, since it is necessary to obtain a solution with a limited number of iterations, the optimum solution may not be determined reliably. In the above equations, since the temperature drops very slowly, the temperature does not drop sufficiently in a finite time. Therefore, in the actual simulated annealing method, the temperature is often lowered faster rather than the logarithmic temperature change.

Figure 7:
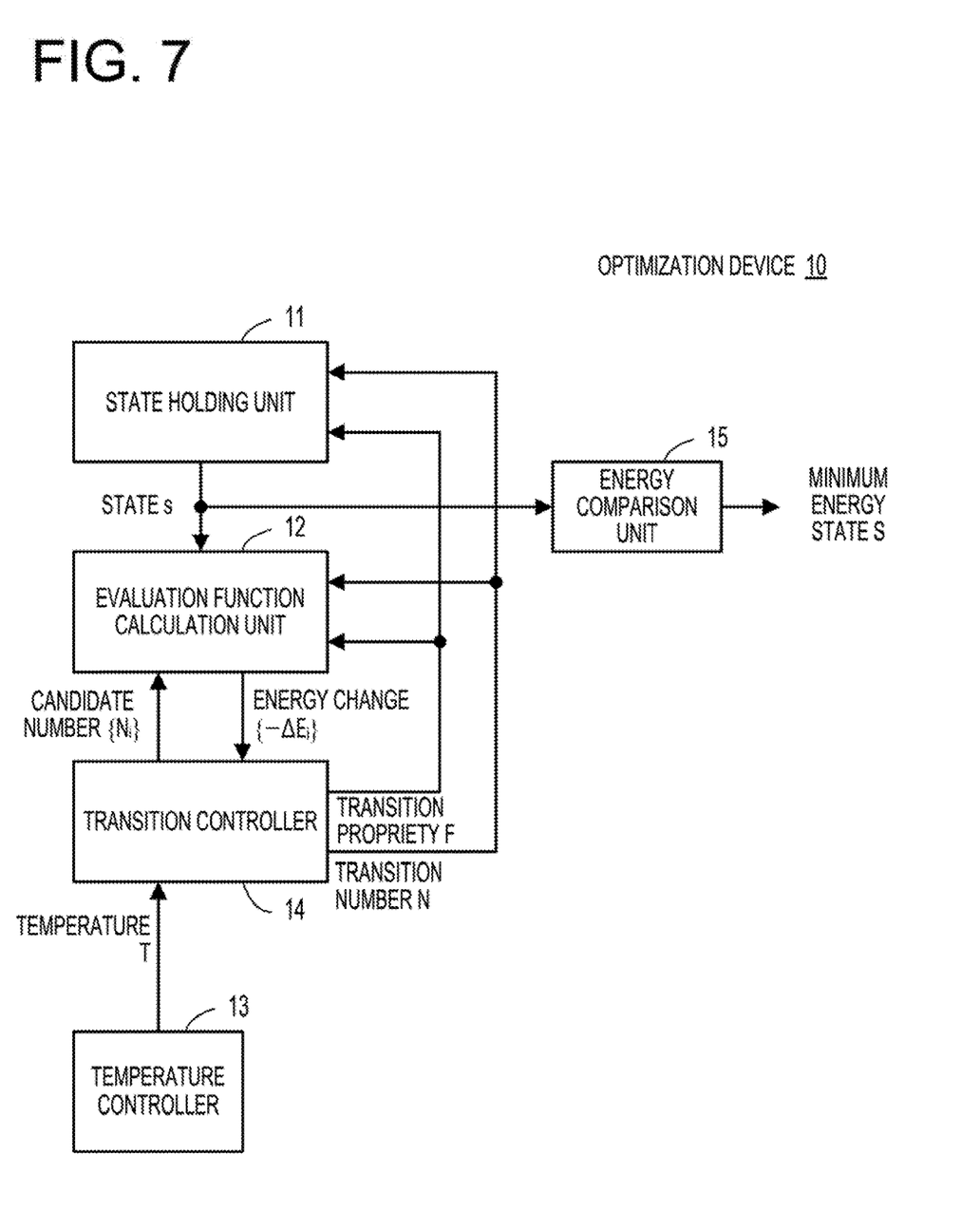
FIG. 7 is a view illustrating a conceptual configuration of an optimization device by a simulated annealing method.

FIG. 7 illustrates a conceptual configuration of an optimization device by a simulated annealing method. A case where a plurality of state transition candidates is generated will be described in the following description, but the original basic simulated annealing method is to generate transition candidates one by one.

An optimization device 10 includes a state holding unit 11 that holds the current state S (values of a plurality of state variables). The optimization device 10 further includes an evaluation function calculation unit 12 that calculates an energy change value $\{-\Delta E_i\}$ of each state transition when a state transition from the current state S occurs due to a change in one of the values of the plurality of state variables. The optimization device 10 further includes a temperature controller 13 that controls a temperature value T, and a transition controller 14 that controls a state change. Based on the temperature value T, the energy change value $\{-\Delta E_i\}$, and a random number value, the transition controller 14 determines stochastically whether to accept any of a plurality of state transitions according to a relative relationship between the energy change value $\{-\Delta E_i\}$ and the thermal excitation energy. The optimization device 10 further includes an energy comparison unit 15 that specifies the minimum energy state S among the states generated by the state transitions.

The operation in one time iteration is as follows. First, the transition controller 14 generates one or more candidates (candidate number $\{N_i\}$) for state transition from the current state s held in the state holding unit 11 to the next state. The evaluation function calculation unit 12 calculates the energy change value $\{-\Delta E_i\}$ for each state transition listed as a candidate using the current state S and the state transition candidates. The transition controller 14 uses the temperature value T generated by the temperature controller 13 and a random variable (random number value) generated by a random number generator unit in the transition controller 14 to permit the state transition with the acceptance probability of the above equations (1) to (3) in response to the energy change value $\{-\Delta E_i\}$ of each state transition. Then, the transition controller 14 calculates transition propriety $\{fi\}$ indicating whether to accept each state transition (hereinafter, also referred to as propriety of state transition). When there are plural permitted state transitions, the transition controller 14 randomly selects one of the permitted state transitions using a random number value. Then, the transition controller 14 outputs the transition number N and transition propriety F of the selected state transition. When there are plural permitted state transitions, the value of the state variable stored in the state holding unit 11 is updated according to a selected state transition.

Starting from the initial state, the temperature controller 13 repeats the above repetition while lowering the temperature value, and the operation is ended when the number of repetitions reaches a certain number or when an end determination condition such as a condition that energy reaches a certain value is satisfied. An answer output by the optimization device 10 is the state at the end. However, in reality, since the temperature T does not become 0 with a finite number of iterations, the occupancy probability of the state has a distribution represented by the Boltzmann distribution even at the end, which is not necessarily an optimal value or a good solution. Therefore, it is a realistic solution to hold the state of the minimum energy obtained so far during the iteration and finally output such a state.

Here, supplementary descriptions will be made on a mechanism that has not been described so far and permits the state transition with the acceptance probability represented by the equations (1) to (3) by the transition controller 14.

A circuit that outputs 1 with an acceptance probability "p" and outputs 0 with an acceptance probability (1−p) may be implemented by a comparator that has two inputs "a" and "b", outputs 1 when a>b, and outputs 0 when a<b, in which the acceptance probability "p" is input into the input "a" and a uniform random number taking a value of an interval [0, 1) is input into the input "b". Therefore, the above function may be implemented by inputting, into the input "a" of the comparator, the value of the acceptance probability "p" which is calculated using the equation of (1) from the energy change value and the temperature T.

That is, when "f" is a function used in the equation of (1) and "u" is a uniform random number taking a value of the interval [0, 1), the above function may be implemented in a circuit that outputs 1 as the transition propriety F when $f(\Delta E/T)$ is larger than "u".

This may be left as it is, but the same function may be implemented even when the following modification is made. Even when the same monotonically increasing function is applied to two numbers, the magnitude relationship does not change. Therefore, the output of the comparator does not change even when the same monotonically increasing function is applied to the two inputs of the comparator. When the inverse function $f^{-1}$ of f is adopted as the monotonically increasing function, a circuit that outputs 1 when $-\Delta E/T$ is larger than $f^{-1}(u)$ or a circuit that outputs 1 when $\Delta E/T$ is equal to or less than $f^{-1}(u)$ is sufficient. Further, since the temperature T is positive, a circuit that outputs 1 when $-\Delta E$ is larger than $Tf^{-1}(u)$ or a circuit that outputs 1 when $\Delta E$ is equal to or less than $Tf^{-1}(u)$ is sufficient. The transition controller 14 generates the uniform random number "u" and outputs a value of $f^{-1}(u)$ using a conversion table that converts the uniform random number "u" into a value of $f^{-1}(u)$. When the Metropolis method is applied, $f^{-1}(u)$ is given by the following equation (5). Further, when the Gibbs method is applied, $f^{-1}(u)$ is given by the following equation (6).

[Equation 5]

$$f^{-1}_{metro}(u) = \log(u) \tag{5}$$

[Equation 6]

$$f^{-1}_{Gibbs}(u) = \log\left(\frac{u}{1-u}\right) \tag{6}$$

When solving the optimization problem by the simulated annealing method as described above, the evaluation function to be minimized often includes an objective function representing a numerical value to be minimized and a constraint term for limiting violation of the constraint condition that the solution needs to satisfy. In the evaluation function of an Ising model, the constraint term is expressed in a quadratic form.

Hereinafter, embodiments of the present disclosure will be described with reference to the drawings.

First Embodiment

Figure 1:
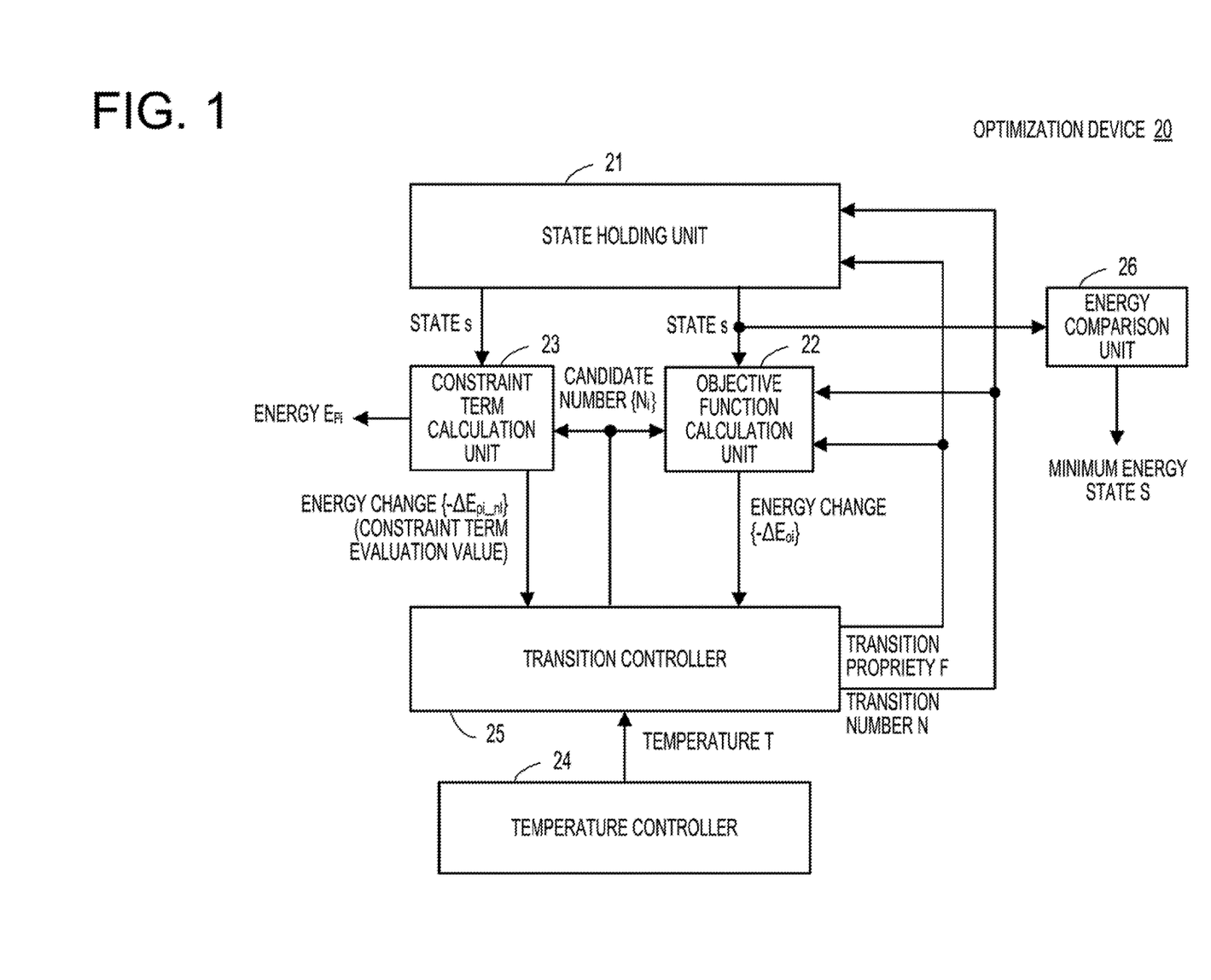
FIG. 1 is a view illustrating an example of an optimization device according to a first embodiment.

FIG. 1 is a view illustrating an example of an optimization device according to a first embodiment.

An optimization device 20 includes a state holding unit 21, an objective function calculation unit 22, a constraint term calculation unit 23, a temperature controller 24, a transition controller 25, and an energy comparison unit 26.

The state holding unit 21 holds a state "s" (values of a plurality of state variables) included in an evaluation function representing energy. Further, the state holding unit 21 updates the values of the state variables based on a transition propriety F and a transition number N output by the transition controller 25. The state holding unit 21 may be implemented using, for example, a register or a memory (e.g., RAM (Random Access Memory)) that holds the values of the plurality of state variables, and a logic circuit that inverts the value of a state variable from 1 to 0 or from 0 to 1 based on the transition propriety F and the transition number N. When the transition propriety F is a value (e.g., 1) that permits the state transition of the transition number N, the value of the state variable corresponding to the transition number N is inverted.

When the state transition occurs in response to a change in any of the values of the plurality of state variables, the objective function calculation unit 22 calculates an energy change value in an objective function included in the evaluation function for each of the plurality of state transitions. Hereinafter, the energy change value in the objective function calculated for each of the plurality of state transitions is denoted as an energy change $\{-\Delta E_{oi}\}$.

The energy $E_o$ of the objective function is expressed by the following equation (7) based on the values of the plurality of state variables, a weighting factor (also called a coupling coefficient) related to the objective function, and a bias factor.

[Equation 7]

$$E_o = -\frac{1}{2}\sum_{i,j} W_{o\_ij} x_i x_j - \sum_i \beta_{o\_i} x_i \quad (7)$$

In the equation (7), $x_i$ and $x_j$ are state variables, $W_{o\_ij}$ is a weighting factor between the state variables $x_i$ and $x_j$ in the objective function, and $\beta o\_i$ is a bias factor between the state variables $x_i$ and $x_j$ in the objective function.

The objective function calculation unit 22 calculates the energy of the current objective function and the energy of an objective function when each of a plurality of state transitions (state transitions designated by candidate numbers $\{N_i\}$ to be described later) occurs. Then, the objective function calculation unit 22 calculates an energy change $\{-\Delta E_{oi}\}$ that is a difference between the energy of the current objective function and the energy of the objective functions when each of the plurality of state transitions occurs. For example, the energy change $\Delta E_{oi}$ of the objective function when the value of $x_i$ is inverted is expressed by the following equation (8).

[Equation 8]

$$\Delta E_{oi} = E_{o\_i} - E_{o\_current} \quad (8)$$

In the equation (8), $E_{o\_i}$ is the energy of the objective function after the inversion of the value of $x_i$, and $E_{o\_current}$ is the energy of the current objective function (before the change of $x_i$). The objective function calculation unit 22 is implemented using, for example, a logic circuit such as a product-sum operation circuit, a register or a memory (e.g., a RAM) that holds a weighting factor and a bias factor, and the like. The register or memory that holds the weighting factor and the bias factor may be outside the objective function calculation unit 22.

When a state transition occurs in response to a change in any of the plurality of state variable values, the constraint term calculation unit 23 calculates a constraint term evaluation value that is an evaluation value of a constraint term in the evaluation function for each of the plurality of state transitions. The constraint term evaluation value is calculated, for example, as follows. In the following, the constraint term evaluation value calculated for each of the plurality of state transitions may be expressed as an energy change $\{-\Delta E_{pi\_nl}\}$.

The energy $E_p$ of the constraint term is expressed by the following equation (9) based on the values of the plurality of state variables, and a weighting factor and a bias factor related to the constraint term.

[Equation 9]

$$E_p = -\frac{1}{2}\sum_{i,j} W_{p\_ij} x_i x_j - \sum_i \beta_{p\_i} x_i \quad (9)$$

In the equation (9), $W_{p\_ij}$ is a weighting factor between the state variables $x_i$ and $x_j$ in the constraint term, and $\beta_{p\_i}$ is a bias factor for the state variable $x_i$ in the constraint term.

The constraint term calculation unit 23 calculates the energy of the constraint term before and after any of the plurality of state variables changes. That is, the constraint term calculation unit 23 calculates the energy of the current constraint term and the energy of the constraint term when each of the plurality of state transitions (state transitions designated by the candidate numbers $\{N_i\}$ to be described later) occurs.

Further, the constraint term calculation unit 23 calculates, for each of the plurality of state transitions, a first nonlinear constraint term by performing a nonlinear processing, which limits the amount of the energy of the constraint term, on the constraint term before any of the plurality of state variables changes and a second nonlinear constraint term by performing the nonlinear processing on the constraint term after the any of the plurality of state variables changes. Thereafter, the constraint term calculation unit 23 calculates, for each of the plurality of state transitions, an energy change $\{-\Delta E_{pi\_nl}\}$ that is a difference between the first nonlinear constraint term and the second nonlinear constraint term. For example, an energy change $\Delta_{Epi\_nl}$, which is a constraint term evaluation value when the value of $x_i$ changes, is expressed by the following equation (10).

[Equation 10]

$$\Delta E_{pi\_nl} = f(E_{p\_i}) - f(E_{p\_current}) \quad (10)$$

In the equation (10), $f(E_{p\_i})$ is a nonlinear constraint term calculated by performing nonlinear processing on the energy $E_{p\_i}$ of the constraint term after the change of the value of $x_i$. $f(E_{p\_current})$ is a nonlinear constraint term calculated by performing nonlinear processing on the energy $E_{p\_current}$ of the current constraint term (before the change of $x_i$).

Further, the constraint term calculation unit 23 may output the energy $E_p$ (e.g., the energy $E_{p\_current}$) of the calculated constraint term.

The constraint term calculation unit 23 is implemented using, for example, a logic circuit such as a product-sum operation circuit, a register or a memory that holds a weighting factor and a bias factor, a circuit that performs nonlinear processing (e.g., a selection circuit that selects and outputs a value corresponding to the energy of the constraint term), and the like. The register or the memory that holds the weighting factor and the bias factor may be outside the constraint term calculation unit 23.

The temperature controller 24 controls a temperature T. In order to implement the simulated annealing method, the temperature controller 24 performs, for example, a control of decreasing the temperature T according to a predetermined schedule.

The temperature controller 24 may be implemented by an electronic circuit for a specific application, such as an ASIC (Application Specific Integrated Circuit) or an FPGA (Field Programmable Gate Array). The temperature controller 24 may be a processor such as a CPU (Central Processing Unit) or a DSP (Digital Signal Processor). In that case, the processor controls the temperature T by executing a program stored in a memory (not illustrated).

The transition controller 25 determines stochastically whether to accept any of the plurality of state transitions based on an evaluation value that is the sum of the energy change $\{-\Delta E_{oi}\}$ and the energy change $\{-\Delta E_{pi\_nl}\}$, the temperature T, and a random number value. For example, the transition controller 25 uses the random number value to generate and output a candidate number $\{N_i\}$. In addition, the transition controller 25 calculates the evaluation value $\{-\Delta E_i\}=\{-\Delta E_{oi}\}+\{-\Delta E_{pi\_nl}\}$ for each of the plurality of state transitions designated by the candidate number $\{N_i\}$. Further, the transition controller 25 calculates a product $Tf^{-1}(u)$ of the temperature T and the random number value (corresponding to thermal excitation energy). Then, the transition controller 25 determines stochastically whether to accept any of the plurality of state transitions based on a result of comparison between $Tf^{-1}(u)$ and $\{-\Delta E_i\}$. In a case where the transition controller 25 is a circuit that outputs a transition propriety F indicating that a state transition is accepted when $\{-\Delta E_i\}<Tf^{-1}(u)$, the state transition acceptance probability becomes smaller as $\{-\Delta E_i\}$ becomes positively larger. When there is a plurality of permitted state transitions, the transition controller 25 randomly selects one of the permitted state transitions using a random number value. Then, the transition controller 25 outputs a transition number N of the selected state transition, and a transition propriety F.

When there is no permitted state transition, the transition controller 25 may add or subtract an offset value to or from one of the energy change $\{-\Delta E_{oi}\}$ and $Tf^{-1}(u)$ so that the state transition acceptance probability increases (see, e.g., Japanese Laid-Open Patent Publication No. 2018-063626).

The transition controller 25 as described above may be implemented using, for example, an adder circuit, a multiplier circuit, a selector, a comparator, a random number generation circuit, a memory (e.g., a RAM) that stores $f^{-1}(u)$ corresponding to a random number value, and the like.

The energy comparison unit 26 receives the current state "s" and uses a weighting factor and a bias factor regarding the objective function and the constraint term to calculate the energy for the current state "s". In addition, the energy comparison unit 26 holds the minimum energy and a state when the minimum energy is obtained (minimum energy state S). When the energy obtained from the current state "s" is lower than the minimum energy obtained so far, the energy comparison unit 26 updates the minimum energy and stores the state "s" as the minimum energy state S. Further, the energy comparison unit 26 outputs the minimum energy state S.

Such an energy comparison unit 26 may be implemented using, for example, a comparator, a register, or a memory (e.g., a RAM).

Hereinafter, an operation example of the optimization device 20 will be described.

Figure 2:
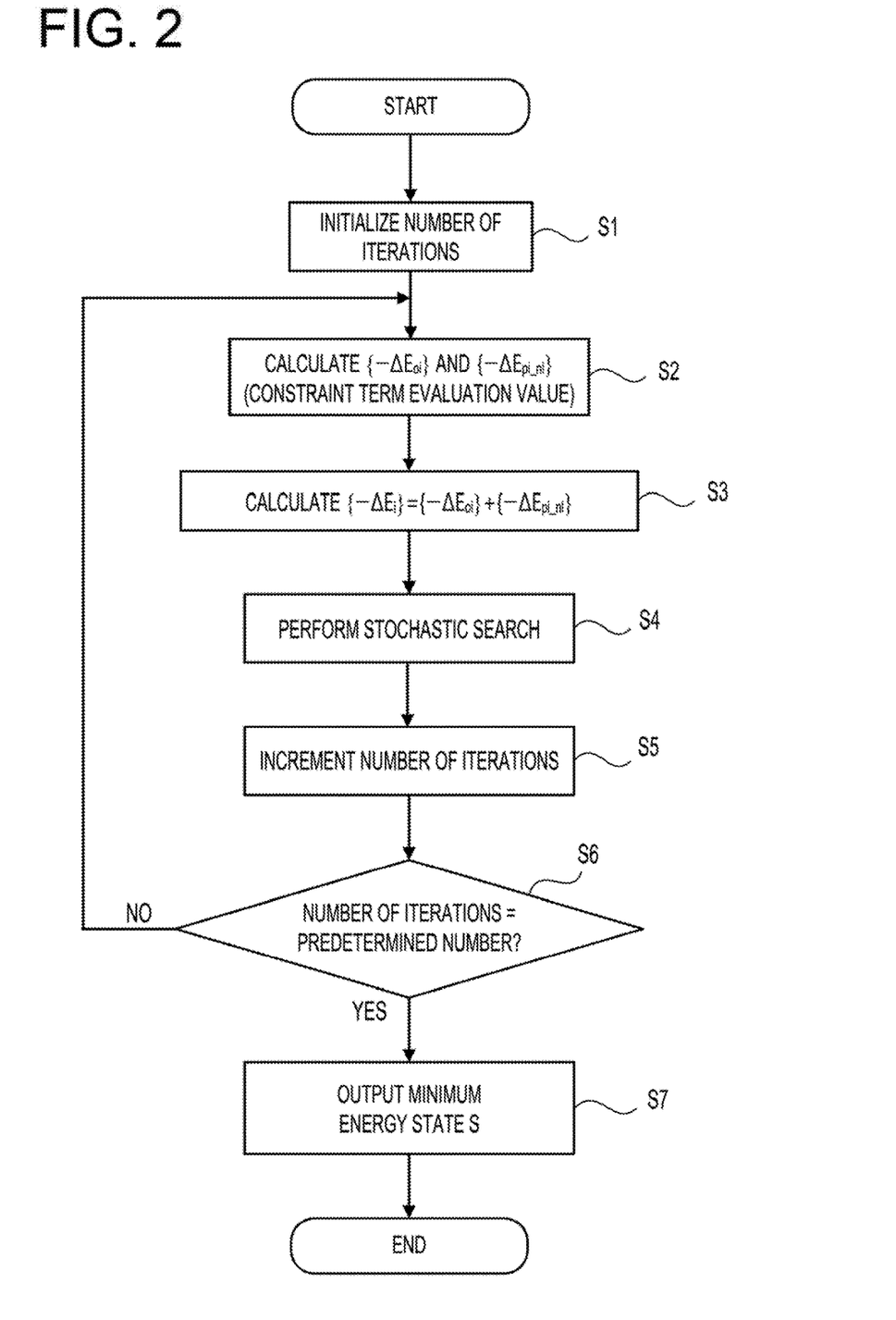
FIG. 2 is a flowchart illustrating a flow of an example of the operation of the optimization device.

FIG. 2 is a flowchart illustrating a flow of an example of the operation performed by the optimization device.

First, in the optimization device 20, the number of iterations is initialized by a controller (controller) (not illustrated) that manages the number of iterations (step S1). Thereafter, an energy change $\{-\Delta E_{oi}\}$ and an energy change $\{-\Delta E_{pi\_nl}\}$ (a constraint term evaluation value) are calculated by the above-described processing of the objective function calculation unit 22 and the constraint term calculation unit 23 (step S2).

Then, the transition controller 25 calculates the evaluation value $\{-\Delta E_i\}=\{-\Delta E_{oi}\}+\{-\Delta E_{pi\_nl}\}$ that is the sum of the change value $\{-\Delta E_{oi}\}$ and the constraint term evaluation value $\{-\Delta E_{pi\_nl}\}$ (step S3), and performs a stochastic search (step S4). The stochastic search includes the above-described processing of the transition controller 25 determining stochastically whether to accept any of the plurality of state transitions based on $\{-\Delta E_i\}$, the temperature T, and the random number value, and the above-described processing of the state holding unit 21 updating the state variable based on the transition propriety F and the transition number N.

Thereafter, the number of iterations is incremented by the controller (step S5), and it is determined whether the number of iterations has reached a predetermined number (step S6). When it is determined that the number of iterations has not reached the predetermined number, the process from step S2 is repeated. When it is determined that the number of iterations has reached the predetermined number, the controller causes the energy comparison unit 26 to output the minimum energy state S (step S7) and ends the process. Although not illustrated in FIG. 2, in order to implement the simulated annealing method, the temperature controller 24 performs a control to lower the temperature T, for example, every time the number of iterations reaches a certain number (smaller than the predetermined number). Therefore, the temperature controller 24 may perform processing of the controller (controller) that manages the number of repetitions.

The optimization device 20 as described above does not use an energy difference between the constraint terms before and after a change in any of the plurality of state variables to determine a transition propriety, but calculates the constraint term evaluation value, which is the evaluation value of the constraint term, for each of the plurality of state transitions, to use the constraint term evaluation value for determining the transition propriety. For example, when the energy of the constraint term in a constraint violation state that violates a plurality of constraint conditions becomes larger and an energy difference between the constraint terms is used to determine the transition propriety, the difference also becomes larger and the acceptance probability of transition to the constraint violation state becomes smaller.

In contrast, by using the constraint term evaluation value as described above, the optimization device 20 may limit the increase of $\{-\Delta E_i\}$ even when the energy of the constraint term is large, and the acceptance probability of transition to the constraint violation state may be increased. This may accelerate a transition (transition that goes beyond the potential peak) from a certain energy state to a lower energy state via a constraint violation state, thereby speeding up the search for the ground state. That is, the time to reach optimization may be shortened.

Further, the constraint term calculation unit 23 may easily check whether the current state includes a constraint violation by outputting the calculated constraint term energy $E_p$. This is because the presence or absence of a constraint violation may be determined based on whether the energy $E_p$ is 0. The constraint term energy $E_p$ when the minimum energy state S is obtained may be stored in a register or a memory. Thereby, it may be easily checked whether the minimum energy state S includes a constraint violation.

Nonlinear Processing Example

Hereinafter, an example of nonlinear processing performed at the time of calculation of the energy change $\{-\Delta E_{pi\_nl}\}$ in the constraint term evaluation value will be described.

The nonlinear processing is performed using, for example, one of the following three nonlinear functions.

Figure 3:
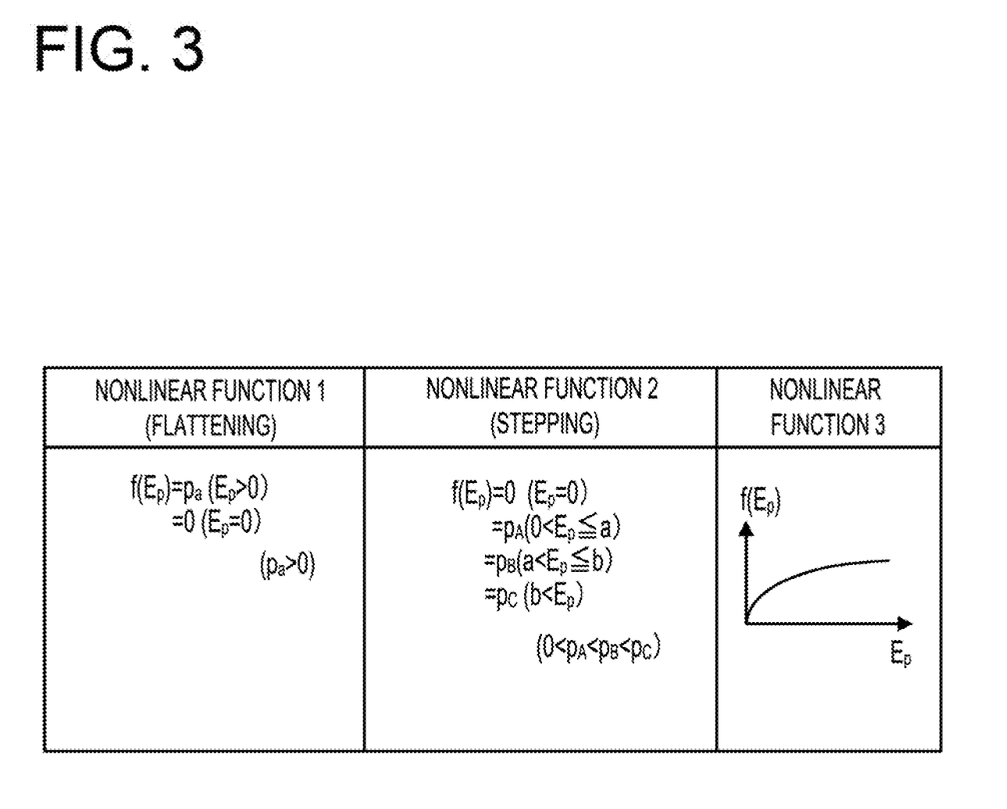
FIG. 3 is a view illustrating an example of a nonlinear function.

FIG. 3 is a view illustrating examples of a nonlinear function.

An example of a first nonlinear function (nonlinear function 1) is a function that may limit the upper limit of the constraint term energy $E_p$ most simply.

The nonlinear function 1 flattens (in a stepped form with one stage) $f(E_{p\_i})$ and $f(E_{p\_current})$ (hereinafter collectively referred to as $f(E_p)$), which are the above-described nonlinear constraint terms. For example, as illustrated in FIG. 3, when the constraint term energy $E_p$ is larger than 0 (i.e., in the constraint violation state) or when $f(E_p)=p_a$, that is, when the energy $E_p$ is 0 (i.e., not in the constraint violation state), the nonlinear function 1 is a function of $f(E_p)=0$.

The sign $P_a$, which is a penalty coefficient parameter, is a constant value greater than zero. The penalty coefficient parameter $p_a$ is smaller than the maximum value of the energy of the constraint term and is appropriately set so that the minimum energy state S does not violate any constraint condition.

In a case where such a nonlinear function 1 is used, even when any condition violates certain constraint conditions, $f(E_p)$, which is a nonlinear constraint term of the energy $E_p$ of the constraint term in that state, becomes a constant upper limit value $(=p_a)$.

A second nonlinear function example (nonlinear function 2) is to step $f(E_p)$ according to the energy $E_p$ (in a stepped form with multiple stages). For example, as illustrated in FIG. 3, the nonlinear function 2 is a function that sets $f(E_p)$ to 0 when the constraint term energy $E_p$ is 0, $f(E_p)$ to $p_A$ when $0<E_p \le a$, $f(E_p)$ to $p_B$ when $a<E_p \le b$, and $f(E_p)$ to $p_C$ when $b<E_p$.

The signs $p_A$, $p_B$, and $p_C$, which are penalty coefficient parameters, have a relationship of $0<p_A<p_B<p_C$. The penalty coefficient parameter $p_C$, which is the largest of the penalty coefficient parameters $p_A$, $p_B$, and $p_C$, is smaller than the maximum value of the energy of the constraint term and is appropriately set within a range in which the state transition acceptance probability is maintained to a certain extent.

When such a nonlinear function 2 is used, since a plurality of $f(E_p)$s corresponding to the constraint term energy $E_p$ may be obtained, the state transition acceptance probability may be changed in a plurality of stages according to the number of state constraint violations. Further, in a case where the nonlinear function 2 is used, even when a certain state violates certain constraint conditions, $f(E_p)$, which is a nonlinear constraint term of the constraint term energy $E_p$ in that state, does not increase over the penalty coefficient parameter $p_C$ (upper limit value).

In the example of the nonlinear function 2 in FIG. 3, $f(E_p)$ is changed in four steps according to the energy $E_p$. However, $f(E_p)$ may be changed in three steps or five or more steps.

A third nonlinear function example (nonlinear function 3) is to change $f(E_p)$ into a curved shape according to the energy $E_p$. The nonlinear function 3 is a function that converges $f(E_p)$ to a predetermined upper limit value as the energy $E_p$ increases, for example, as illustrated in FIG. 3. Such a nonlinear function 3 may be implemented by information (table information) indicating a correspondence relationship between the energy $E_p$ and the energy function $f(E_p)$, which is stored in advance in a memory that may be referred to by the constraint term calculation unit 23. The nonlinear function 3 may also be implemented by the constraint term calculation unit 23 performing a monotonically increasing function calculation.

When such a nonlinear function 3 is used, since $f(E_p)$ may be expressed more finely according to the constraint term energy $E_p$, the constraint term may be optimized efficiently.

Second Embodiment

Figure 4:
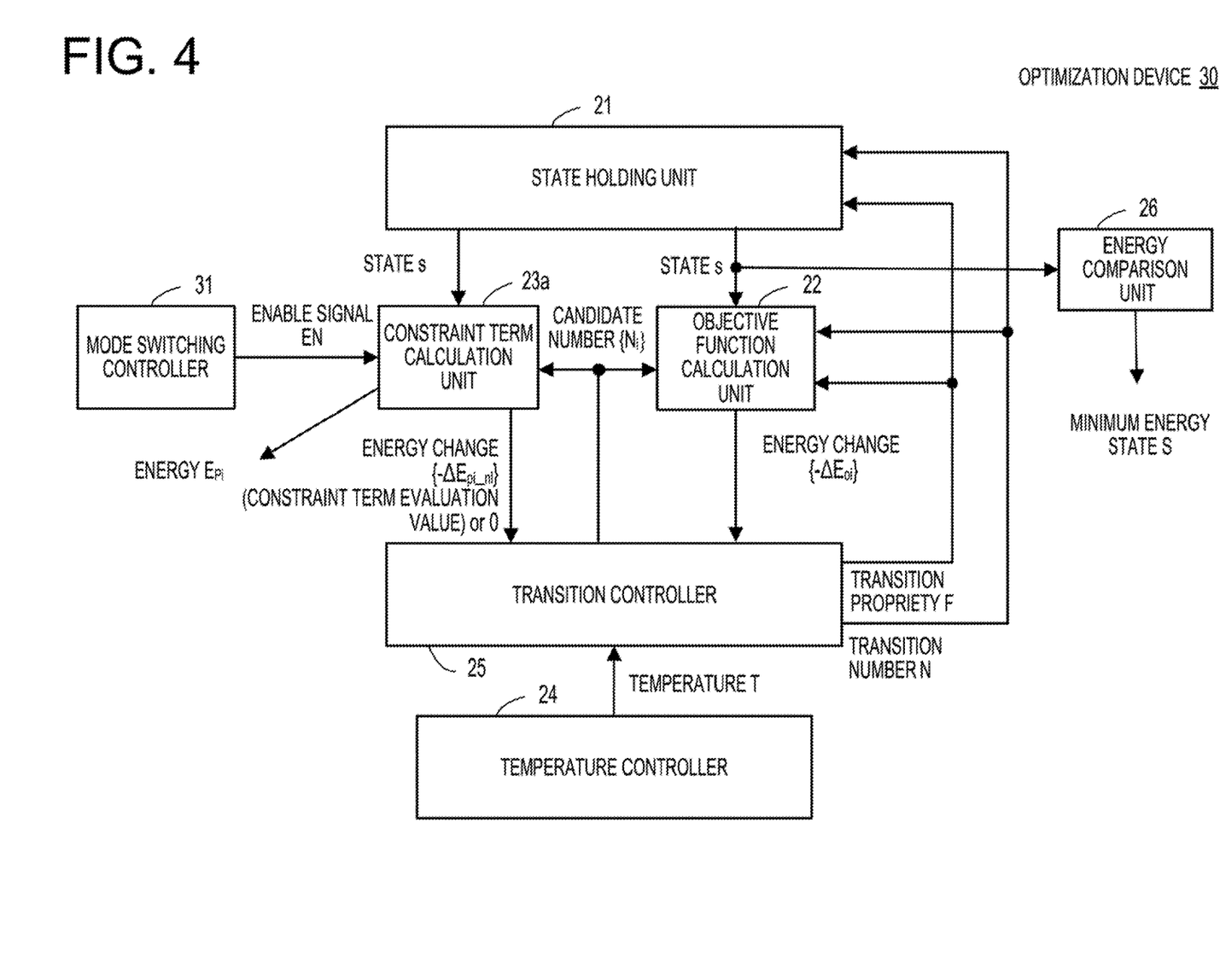
FIG. 4 is a view illustrating an example of an optimization device according to a second embodiment.

FIG. 4 is a view illustrating an example of an optimization device according to a second embodiment. In FIG. 4, the same elements as those in the optimization device 20 illustrated in FIG. 1 are denoted by the same reference numerals.

In the optimization device 30 according to the second embodiment, a constraint term calculation unit 23a has the same function as the constraint term calculation unit 23 according to the optimization device 20, and further has a function of validating or invalidating the function of calculating the energy $\{-\Delta E_{pi\_nl}\}$ according to an enable signal EN.

For example, the constraint term calculation unit 23a validates the function of calculating the energy change $\{-\Delta E_{pi\_nl}\}$ when the enable signal EN is 1, and invalidates the function of calculating the energy change $\{-\Delta E_{pi\_nl}\}$ when the enable signal EN is 0. Such a function may be implemented by a circuit such as a selector that selects whether to supply the calculated energy change $\{-\Delta E_{pi\_nl}\}$ or whether to supply 0 instead of the energy change $\{-\Delta E_{pi\_nl}\}$ to the transition controller 25, for example, based on the enable signal EN. The constraint term calculation unit 23a supplies 0 to the transition controller 25 when the enable signal EN is 0, and supplies the calculated energy change $\{-\Delta E_{pi\_nl}\}$ to the transition controller 25 when the enable signal EN is 1.

The enable signal EN is input from, for example, a mode switching controller 31 as illustrated in FIG. 4. The mode switching controller 31 and the temperature controller 24 may be the same controller (controller).

In a combinatorial optimization problem in which a state often passes through a constraint violation state that violates a plurality of constraint conditions during stochastic search, processing performed by the constraint term calculation unit 23 of the optimization device 20 according to the first embodiment is effective. However, a problem in which a state rarely passes through a constraint violation state that violates a plurality of constraint conditions may be sufficiently solved by the optimization device 10 as illustrated in FIG. 7. When solving such a problem, the constraint term calculation unit 23a invalidates the function of calculating the energy change $\{-\Delta E_{pi\_nl}\}$ as described above. Then, when the objective function calculation unit 22 outputs the energy change $\{-\Delta E_i\}$ for the evaluation function including the constraint term as the energy change $\{-\Delta E_{oi}\}$, the optimization device 30 may be used as the optimization device 10 illustrated in FIG. 7.

Example of Processing of Separating Weighting Factor and Bias Factor

In the above description, the weighting factor and the bias factor related to the objective function, and the weighting factor and the bias factor related to the constraint term are separated from each other. However, this separation processing may be performed by the optimization devices 20 and 30.

Figure 5:
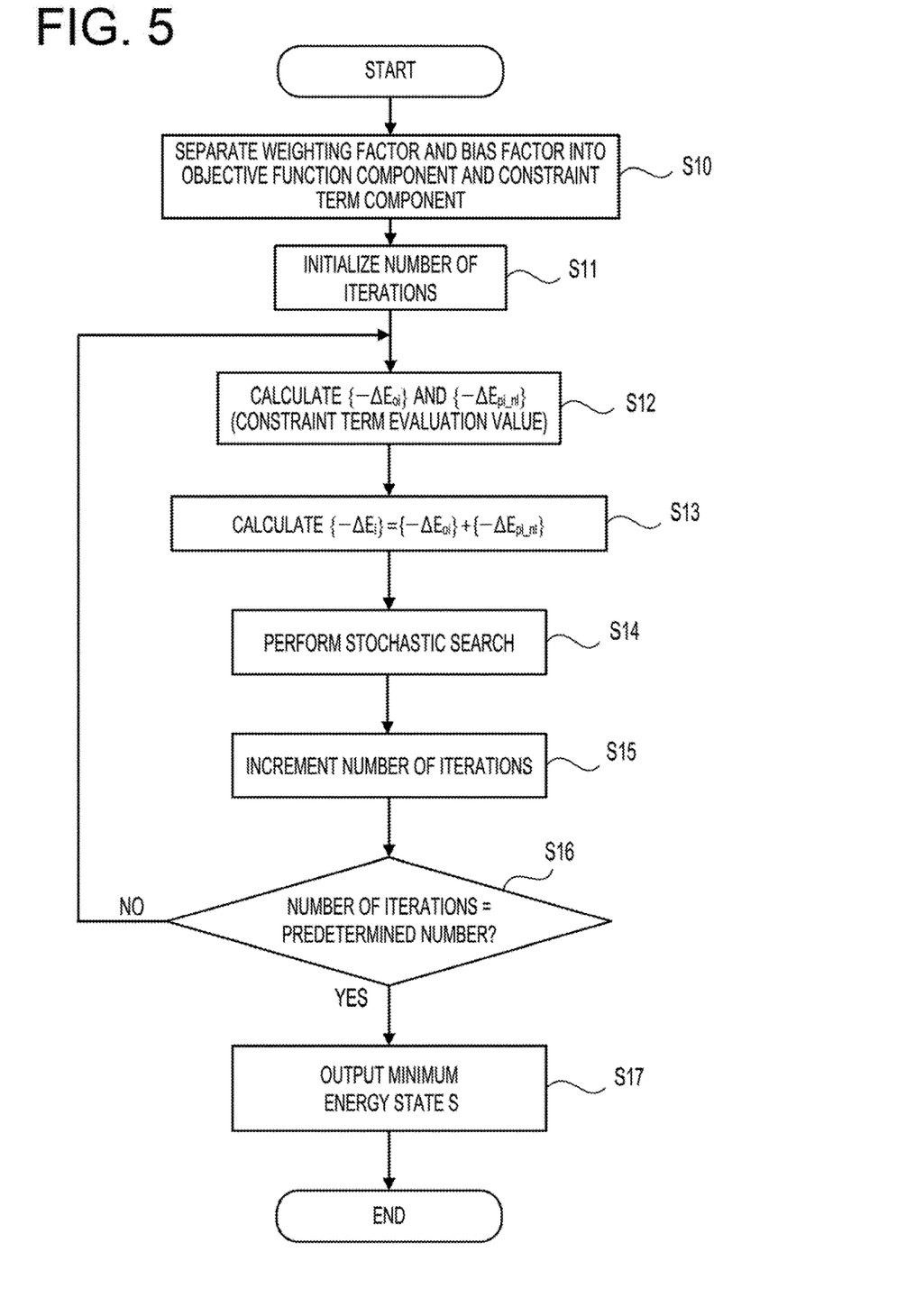
FIG. 5 is a flowchart illustrating a flow of an example of the operation performed by an optimization device including a processing of separating a weighting factor and a bias factor.

FIG. 5 is a flowchart illustrating a flow of an example of the operation by an optimization device including the processing of separating the weighting factor and the bias factor.

First, a weighting factor and a bias factor externally supplied from the optimization devices 20 and 30 are separated into an objective function component and a constraint term component by a controller (not illustrated) in the optimization devices 20 and 30 (step S10).

Figure 6:
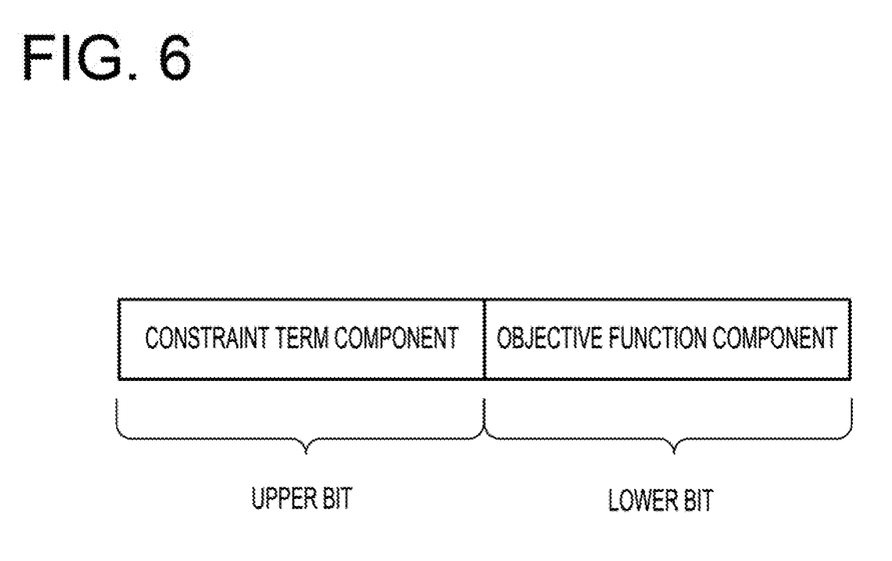
FIG. 6 is a view illustrating an example of separation of an objective function component and a constraint term component.

FIG. 6 is a view illustrating an example of separation of an objective function component and a constraint term component.

For example, as illustrated in FIG. 6, the controller separates lower bits in the weighting factor and the bias factor into an objective function component, and upper bits therein into a constraint term component. Then, the controller stores the weighting factor and the bias factor of the objective function component in a register or a memory of the objective function calculation unit 22, and stores the weighting factor and the bias factor of the constraint term component in a register or a memory of the constraint term calculation unit 23 or 23*a*.

In FIG. 5, the processes of steps S11 to S17 are the same as those of steps S1 to S7 illustrated in FIG. 2.

By performing the separation processing as described above in the optimization devices 20 and 30, the objective function component and the constraint term component of the weighting factor and the bias factor may not separately be received from memories outside the optimization devices 20 and 30.

According to an aspect of the embodiments, the search for the ground state may be speeded up.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An optimization device comprising:
a state hold circuit configured to hold values of a plurality of state variables included in an evaluation function that represents energy;
an objective function calculation circuit configured to calculate an energy change value in an objective function included in the evaluation function for each of a plurality of state transitions when a state transition occurs in response to a change in any of the values of the plurality of state variables;
a constraint term calculation circuit configured to calculate a constraint term evaluation value, which is an evaluation value of a constraint term included in the evaluation function, for each of the plurality of state transitions;
a temperature control circuit configured to control a temperature value that indicates a temperature; and
a transition control circuit configured to determine stochastically whether to accept any of the plurality of state transitions based on the temperature value, a random number value, and a sum of the change value and the constraint term evaluation value.

2. The optimization device according to claim 1, wherein the constraint term calculation circuit is further configured to:
calculate, for each of the plurality of state transitions, a first nonlinear constraint term by performing a nonlinear processing on the constraint term before any of the plurality of state variables changes and a second nonlinear constraint term by performing the nonlinear processing on the constraint term after the any of the plurality of state variables changes, the nonlinear processing limiting an amount of energy of the constraint term; and
calculate, for each of the plurality of state transitions, the constraint term evaluation value, which is a difference between the first nonlinear constraint term and the second nonlinear constraint term.

3. The optimization device according to claim 2, wherein each of the first nonlinear constraint term and the second nonlinear constraint term increases in a stepped shape or a curved shape according to the energy of the constraint term and has a predetermined upper limit value.

4. The optimization device according to claim 1, wherein the constraint term calculation circuit is further configured to:
calculate the energy of the constraint term based on the values of the plurality of state variables, and a weighting factor and a bias factor related to the constraint term; and
output the energy of the constraint term.

5. The optimization device according to claim 1, wherein the constraint term calculation circuit is further configured to:
select whether to supply the constraint term evaluation value or whether to supply 0 instead of the constraint term evaluation value to the transition control circuit based on an input enable signal.

6. A control method of an optimization device, the control method comprising:
holding, by a state hold circuit included in the optimization device, values of a plurality of state variables included in an evaluation function that represents energy;
calculating, by an objective function calculation circuit included in the optimization device, an energy change value in an objective function included in the evaluation function for each of a plurality of state transitions when a state transition occurs in response to a change in any of the values of the plurality of state variables;
calculating, by a constraint term calculation circuit included in the optimization device, a constraint term evaluation value, which is an evaluation value of a constraint term included in the evaluation function, for each of the plurality of state transitions;
controlling, by a temperature control circuit included in the optimization device, a temperature value that indicates a temperature; and
determining, by a transition control circuit included in the optimization device, stochastically whether to accept any of the plurality of state transitions based on the temperature value, a random number value, and a sum of the change value and the constraint term evaluation value.

\* \* \* \* \*